United States Patent
Pazhyannur et al.

(10) Patent No.: US 8,611,901 B2
(45) Date of Patent: Dec. 17, 2013

(54) ENTERPRISE CONTROLLER HANDOVER MANAGEMENT OF WIRELESS USER DEVICES BETWEEN RADIO ACCESS POINT DEVICES

(75) Inventors: Rajesh Pazhyannur, Sunnyvale, CA (US); Mark Grayson, Berkshire (GB); Allaukik Abhishek, Irving, TX (US); Daniel Wee, Garland, TX (US); Santhalingam Balasekar, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 12/952,417

(22) Filed: Nov. 23, 2010

(65) Prior Publication Data

US 2012/0129525 A1 May 24, 2012

(51) Int. Cl.
*H04Q 7/20* (2006.01)

(52) U.S. Cl.
USPC ........ 455/436; 455/435.2; 455/444; 455/445; 455/449; 455/453; 370/216; 370/254; 370/331; 370/329; 370/335; 375/213; 375/243; 375/267

(58) Field of Classification Search
USPC ................. 370/216, 254, 331, 329, 332, 335; 455/442, 436, 438, 439, 440, 441, 446, 455/449, 450; 375/213, 243, 267
See application file for complete search history.

(56) References Cited

U.S. PATENT DOCUMENTS

| | | | |
|---|---|---|---|
| 2002/0183053 A1* | 12/2002 | Gopalakrishna et al. | 455/423 |
| 2003/0224786 A1* | 12/2003 | Lee et al. | 455/432.1 |
| 2007/0105557 A1* | 5/2007 | Israelsson et al. | 455/436 |
| 2009/0042578 A1* | 2/2009 | Rinne et al. | 455/442 |
| 2009/0318193 A1 | 12/2009 | Littlefield et al. | |
| 2010/0041405 A1* | 2/2010 | Gallagher et al. | 455/436 |
| 2010/0220656 A1 | 9/2010 | Ramankutty et al. | |
| 2010/0291897 A1 | 11/2010 | Ghai | |

* cited by examiner

*Primary Examiner* — Ajit Patel
*Assistant Examiner* — Fred Casca
(74) *Attorney, Agent, or Firm* — Edell, Shapiro & Finnan, LLC

(57) ABSTRACT

Techniques are provided for transmitting and receiving communications on behalf of wireless user equipment devices between a plurality of radio access point (RAP) devices and a gateway apparatus through a controller apparatus. A controller apparatus generates a plurality of first identifiers used for communications on behalf of corresponding wireless user devices between the controller apparatus and respective RAPs. Each first identifier identifies a wireless user device and a RAP to which the wireless user device is associated. The controller apparatus maps each first identifier to a corresponding one of a plurality of second identifiers for communications exchanged on behalf of the wireless user devices between the controller apparatus and a gateway apparatus in the wireless cellular communication network. The controller apparatus remaps a new first identifier to an existing second identifier when a particular wireless user device has handed over from a first RAP to a second RAP.

17 Claims, 5 Drawing Sheets

600

ENTERPRISE CONTROLLER HANDOVER MANAGEMENT OF WIRELESS USER DEVICES BETWEEN RADIO ACCESS POINT DEVICES

TECHNICAL FIELD

The present disclosure relates to wireless mobile communication infrastructure extensions and deployments.

BACKGROUND

Femtocell access point devices are radio access point devices that are deployed at subscriber sites (e.g., commercial and residential sites) in order to improve coverage of mobile wireless communication service (e.g., cell phone, wireless messaging, mobile data, etc.) and thereby offload the burden on the infrastructure of the mobile service provider. Picocell access point devices operate substantially similarly to femtocell access point devices, but are typically more powerful and support more channels than femtocell access point devices. These radio access point (RAP) devices operate essentially as "mini" cellular ("cell") transceiver towers. Like cell towers, RAPs operate in a licensed spectrum that is subject to strict regulatory constraints on service providers.

RAP devices are increasingly being deployed by enterprises, such as large corporations, that want to extend mobile communication capabilities inside their buildings and other facilities where conventional cellular tower service (also referred to herein as "macrocell" service) might not be available. Mobility of wireless user devices between RAP devices within an enterprise has become a more prevalent feature to consider in designing the capabilities and features of the control equipment used to manage operations of the RAP devices in the enterprise.

DESCRIPTION OF EXAMPLE EMBODIMENTS

Overview

Techniques are provided for transmitting and receiving communications on behalf of wireless user equipment devices between a plurality of radio access point (RAP) devices and a gateway device through a controller apparatus. The controller apparatus is configured to control the plurality of RAP devices operating within their respective coverage areas of a wireless cellular communication network to serve wireless user devices. The controller apparatus generates a plurality of first identifiers used for communications on behalf of corresponding wireless user devices between the controller apparatus and respective RAP devices. Each first identifier identifies a wireless user device and a RAP device to which the wireless user device is associated. The controller apparatus maps each first identifier to a corresponding one of a plurality of second identifiers for communications exchanged on behalf of the wireless user devices between the controller apparatus and a gateway apparatus in the wireless cellular communication network. Each second identifier identifies a wireless user device and a RAP device to which the wireless user device is associated. The controller apparatus remaps a new first identifier to an existing second identifier when a particular wireless user device has handed over from a first RAP device to a second RAP device.

Example Embodiments

Figure 1:
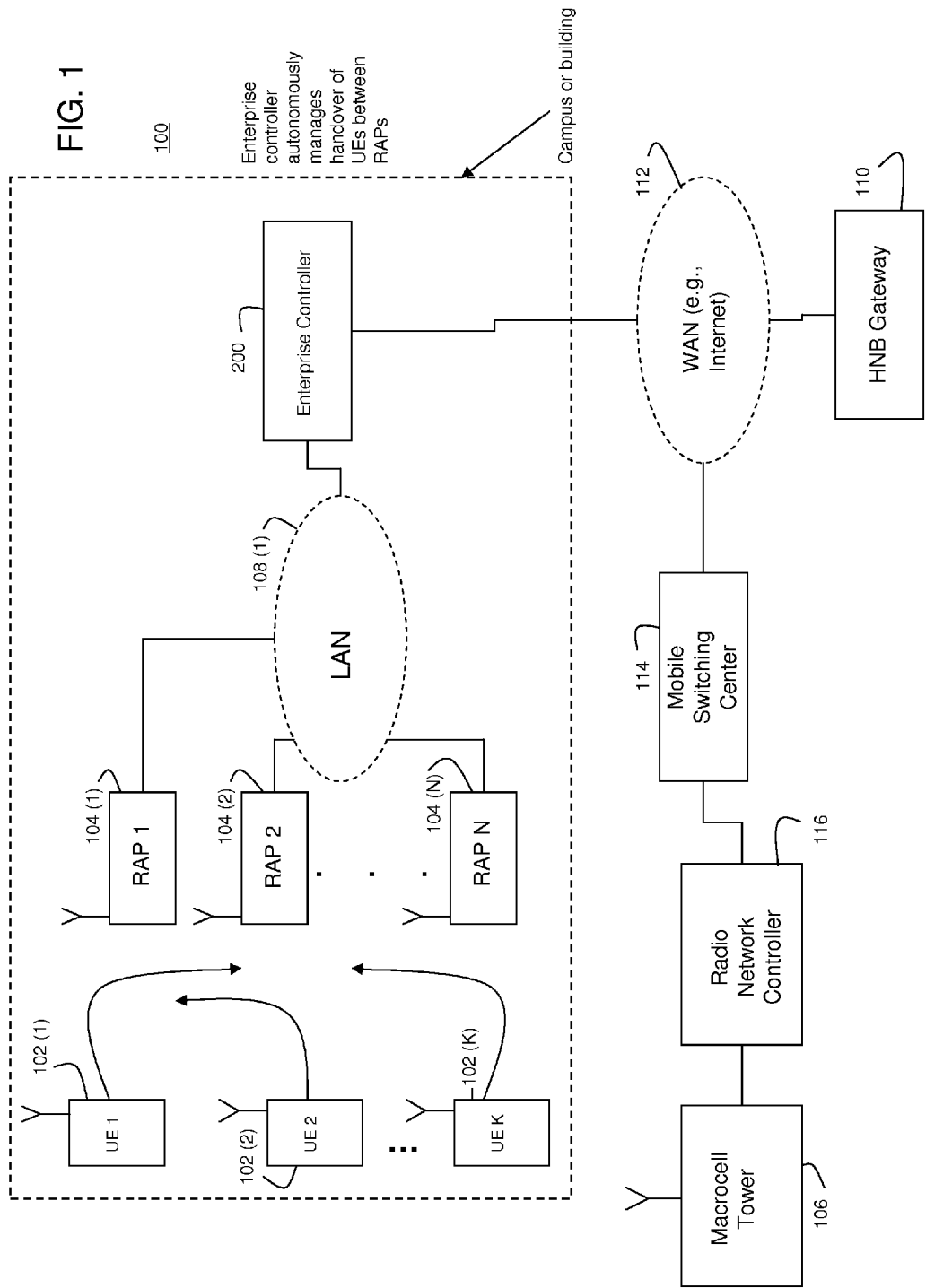
FIG. 1 shows an example of a wireless wide area communication network featuring an enterprise controller configured to autonomously manage handover of wireless user equipment between RAP devices.

FIG. 1 shows an example wireless wide area communication network 100 featuring an enterprise controller configured to autonomously manage handover of wireless user equipment between RAP devices. In general, in network 100, a plurality of wireless user equipment (UE) devices 102(1)-102(K) wirelessly communicate with a plurality of radio access point (RAP) devices (hereinafter referred to as "RAPs") 104(1)-104(N) over wireless connections to transmit and receive network traffic. The UEs 102(1)-102(K) are also capable of wirelessly communicating with fixed macrocell towers, such as the macrocell tower 106. The UEs 102(1)-102(K) may be wireless mobile devices that are configured to use any wireless communication standard now known or hereinafter developed, such as 3G, 4G/Long Term Evolution, etc. The UEs 102(1)-102(K) may move about, with movement of users, as indicated by the arrows in FIG. 1. The UEs 102(1)-(K) are configured to connect wirelessly with any of the RAPs 104(1)-104(N), and multiple UEs 102(1)-102(K) can connect to one or more of the RAPs 104(1)-104(N). The UEs 102(1)-102(K) can roam between RAPs 104(1)-104(N) just like they roam between different macrocell towers.

The RAPs 104(1)-104(N) connect to a local area network (LAN) 108. An enterprise controller apparatus 200 is provided to control the RAPs 104(1)-104(N) that are located within a building or campus. The enterprise controller apparatus 200 is in turn connected, via a wide area network (WAN), e.g., the Internet 112, to a Home Node B (HNB) gateway apparatus 110 that is also connected to the WAN 112. In a given deployment, there are multiple enterprise controllers each of which has responsibility for a designated plurality of RAPs Likewise, there is a plurality of HNB gateways in a network deployment and each enterprise controller is assigned to one HNB gateway. A mobile switching center 114 is provided to handle the direction of traffic to each UE for communication through the appropriate RAP or macrocell tower depending on the current location of the UE. The mobile switching center 114 is also connected to the public telephone switching network (not shown) to couple voice calls to UEs. The macrocell tower 106 connects to the mobile switching center via a radio network controller 116, and as explained herein, there are mobile macrocell towers distributed throughout various locations within a service provider's coverage area. There are also, consequently, multiple radio network controllers to support the multiple macrocell towers.

As the UEs 102(1)-102(K) move from one location to another, the RAPs 104(1)-104(N) may handover communication with the UEs to one another, thus enabling users of the UEs to experience continuous communication capabilities. RAPs 104(1)-104(N) serve as access points for the UEs to the core network (the mobile switching center 114). The RAPs 104(1)-104(N) may be any wireless access point device configured to provide wireless services to a plurality of UEs in a relatively smaller coverage area than a macrocell tower and which are capable of being readily moved from one location to another location (unlike a macrocell tower which is fixed). For example, RAPs 104(1)-104(N) may be Home Node B (HNB) devices, configured for Femtocell or Picocell deployments in consumer, residential or corporate enterprise environments to provide wireless services to the plurality of UEs.

The RAPs 104(1)-104(N) are configured to communicate with the enterprise controller 200 via the LAN 108. The enterprise controller 200, as described hereinafter, is configured to receive and transmit network traffic and communications, on behalf of one or more UEs 102(1)-102(K), to HNB gateway 110 across the WAN 112. The enterprise controller 200 is also configured to receive and transmit signals to the RAPs 104(1)-104(N) across the LAN 108. The HNB gateway 110 is configured to receive and transmit network traffic to the mobile switching center 114 across WAN 112. Similarly, the HNB gateway 110 is configured to receive and transmit network traffic to the enterprise controller 200 across WAN 112. There may be multiple enterprise controllers of the type shown at 200 in a given enterprise deployment to serve different groups of RAPs, but for the sake of simplicity, a single enterprise controller is shown in FIG. 1.

In general, inbound communication traffic originating from the mobile switching center 114 that is destined for one or more of the UEs 102(1)-102(K) reaches the UEs 102(1)-102(K) via the HNB gateway 110, the enterprise controller 200 and a corresponding one of the plurality of RAPs 104(1)-104(N) when the UEs are associated to one of the RAPs 104(1)-104(N). Similarly, outbound communication traffic origination from the UEs 102(1)-(K) that is destined for the mobile switching center 114 reaches the mobile switching center 114 through a corresponding one of the plurality of RAPs 104(1)-104(N), the enterprise controller 200 and the HNB gateway 110.

The dashed box in FIG. 1 indicates portions of the infrastructure of network 100 that may be physically deployed within a given enterprise (for example a commercial or residential campus or building) versus those portions under that are remotely located and connected to the WAN 112. Thus, in the embodiment depicted in FIG. 1, the RAPs 104(1)-104(N) and the enterprise controller 200 are physically located on the enterprise premises. However, it is possible, and still within the scope of the present disclosure that the HNB gateway 110 could be located on the premises of the enterprise or the enterprise controller 200 could be located off site from the enterprise but connected via suitable WAN connection to the RAPs 104(1)-104(N). Precisely where particular components are located is not critical to the described embodiments. From a practical point of view, however, it would be expected that individual RAPs 104(1)-104(N) would be located on the premises of the enterprise where the multiple RAPs 104(1)-104(N) are deployed. It is also contemplated that no matter where the enterprise controller 200 is physically located, it can nevertheless be accessed and managed by network administrators directly or indirectly via some interface provided by the mobile switching center 114.

As explained further hereinafter, the enterprise controller 200 is configured to autonomously manage handover of UEs between RAPs 104(1)-104(N) as the UEs move about and obtain service from different RAPs. As a result, the HNB gateway 110 or mobile switching center 114 has no visibility or awareness of the UE handover events that take place at the enterprise premises.

Figure 2:
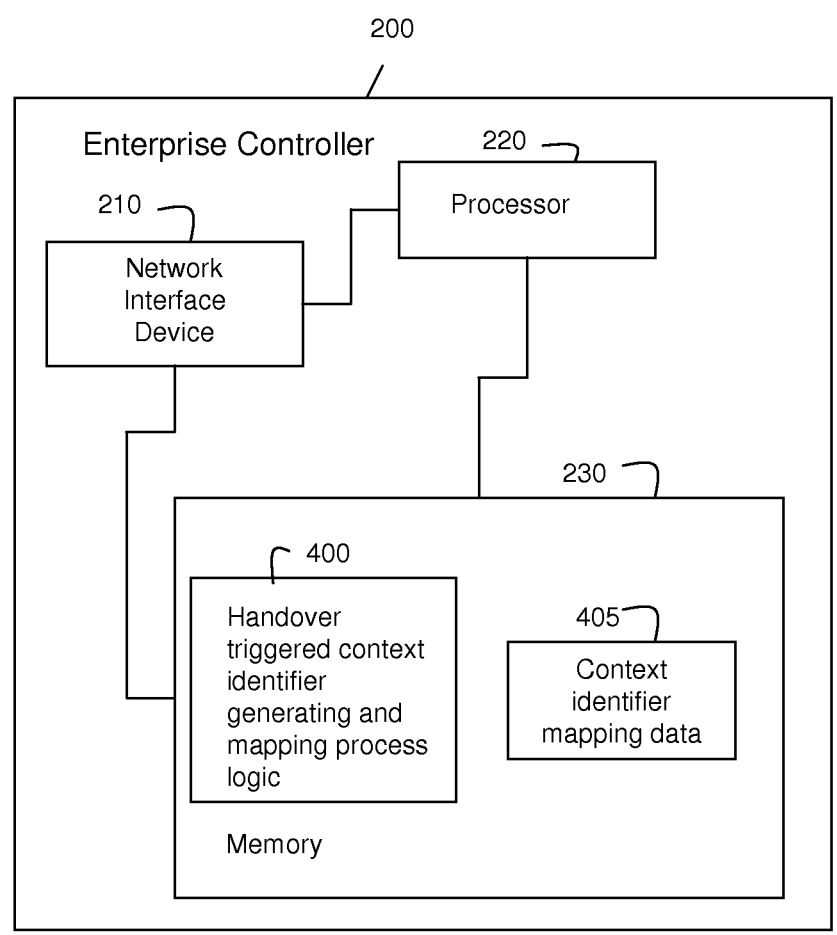
FIG. 2 is an example of a block diagram of an enterprise controller apparatus configured with handover triggered context identifier generating and mapping logic to manage the handover of wireless user equipment between RAP devices.

Turning now to FIG. 2, an example of a block diagram of the enterprise controller 200 is now described. The enterprise controller 200 comprises a network interface device 210, a processor 220 and a memory 230. The network interface device 210 is configured to receive inbound communication messages from HNB gateway 110 (originating from the mobile switching center 114) and to transmit those messages to an appropriate one of the plurality of RAPs 104(1)-104(N) destined for a corresponding one of the plurality of UEs 102(1)-102(K). Similarly, the network interface device 210 is configured to receive outbound communication messages from the RAPs 104(1)-104(N) originating from one of the UEs 102(1)-102(K) and to transmit those messages to the HNB gateway 110 destined for the mobile switching center 114. For example, the network interface device 210 is an Ethernet card or device.

Processor 220 is coupled to the network interface device 210 and to the memory 230. The processor 220 is a microprocessor or microcontroller that is configured to execute program logic instructions (i.e., software) for carrying out various operations and tasks described herein. For example, the processor 220 is configured to execute handover triggered context identifier generating and mapping process logic 400 that is stored in memory 230 in order to generate and map context identifiers to the communication messages on behalf of UEs 102(1)-102(K). The memory 230 may comprise read only memory (ROM), random access memory (RAM), magnetic disk storage media devices, optical storage media devices, flash memory devices, electrical, optical, acoustical or other physical/tangible memory storage devices.

The functions of processor 220 may be implemented by logic encoded in one or more tangible computer readable media (e.g., embedded logic such as an application specific integrated circuit, digital signal processor instructions, software that is executed by a processor, etc), wherein memory 230 stores data used for the operations described herein and stores software or processor executable instructions that are executed to carry out the operations described herein.

The handover triggered context identifier generating and mapping process logic 400 may take any of a variety of forms, so as to be encoded in one or more tangible computer readable memory media or storage device for execution, such as fixed logic or programmable logic (e.g., software/computer instructions executed by a processor) and the processor 220 may be an application specific integrated circuit (ASIC) that comprises fixed digital logic, or a combination thereof. For example, the processor 220 may be embodied by digital logic gates in a fixed or programmable digital logic integrated circuit, which digital logic gates are configured to perform the handover triggered context identifier generating and mapping process logic 400. In another form, the handover triggered context identifier generating and mapping process logic 400 may be embodied in one or more computer readable storage media encoded with software comprising computer executable instructions and when the software is executed operable to perform the operations described herein for the process logic 400.

Also stored in memory 230 is context identifier mapping data 405 that maps first context identifiers used for identifying messages sent between the enterprise controller 200 and RAPs, and second context identifiers used for identifying messages sent between the enterprise controller 200 and the HNB gateway 110.

Figure 3:
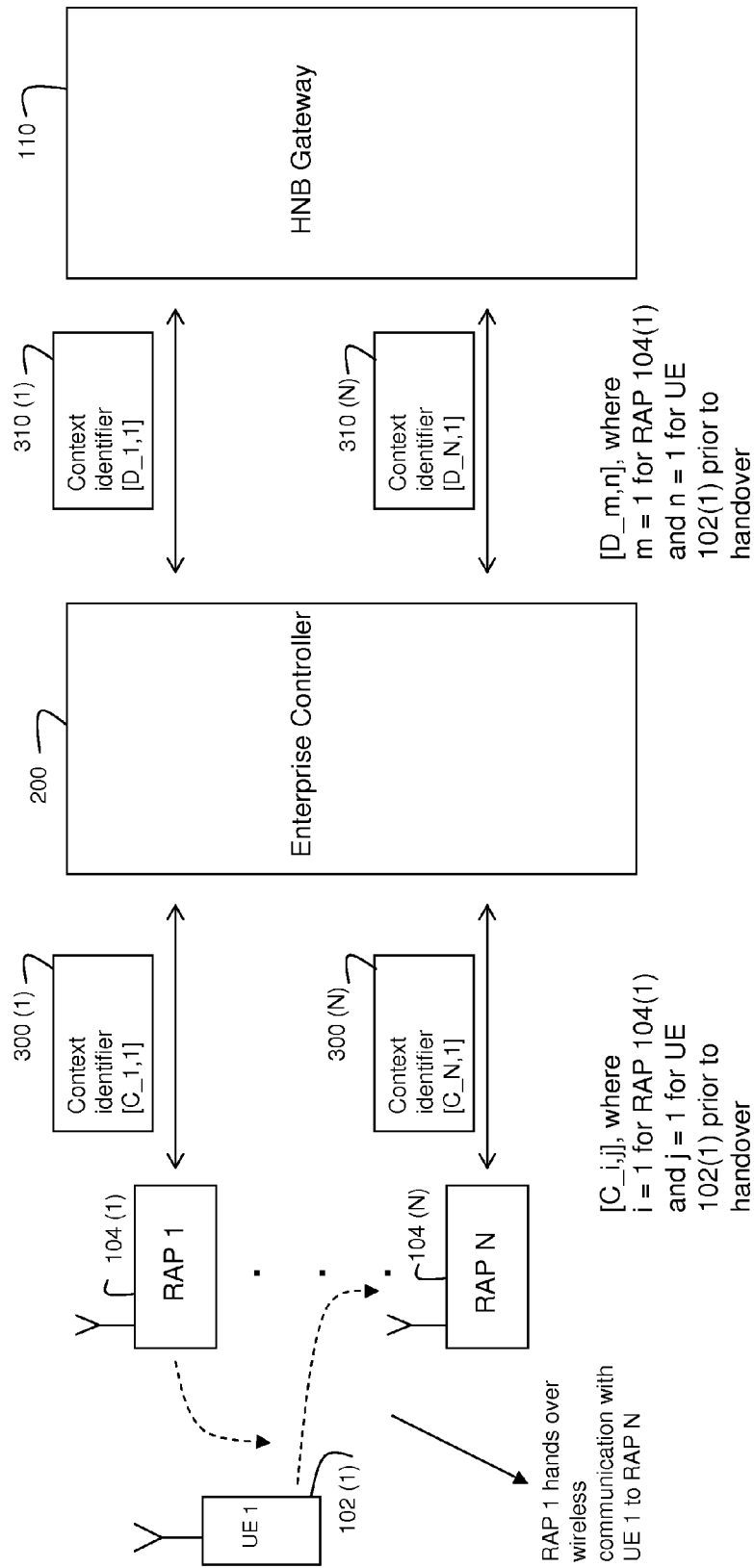
FIG. 3 is a block diagram that illustrates an example of a message exchange between a plurality of RAP devices and an enterprise controller apparatus, and between the enterprise controller apparatus and a Home Node B Gateway apparatus according to the techniques described herein.

Turning now to FIG. 3, examples of messages exchanged between RAPs 104(1)-104(N) and enterprise controller 200 and between enterprise controller 200 and HNB gateway 110 are now described. In general, in FIG. 3, UE 102(1) is initially associated (i.e., "camped on") on RAP 104(1). By virtue of its association to RAP 104(1), UE 102(1) is able to interact with the core network through RAP 104(1). More specifically, when associated to RAP 104(1), UE 102(1) is able to receive inbound communications from enterprise controller 200 that originate from mobile switching center 114 through the HNB gateway 110. Likewise, UE 102(1) is able to transmit outbound communications to enterprise controller 200 that are ultimately destined for the mobile switching center 114 through HNB gateway 110.

The enterprise controller 200 uses a first context identifier, from a plurality of first context identifiers, for messages it sends to and receives from a RAP on behalf of a UE. These first identifiers are denoted as context identifiers [C_i,j], depending on which RAP a UE is camped on, where [C_i,j] means the context identifier for UE 102(j) when UE 102(j) is camped on RAP 104(i), for i=1 to N and j=1 to K. The enterprise controller 200 assigns different context identifiers according to this definition for the different UEs depending on which RAP the UE is camped on. For example, when UE 102(1) is camped on RAP 104(1), the enterprise controller 200 uses context identifier [C_1,1] shown at 300(1) for messages exchanged between RAP 104(1) on behalf of UE 102 (1). If UE 102(1) were camped on RAP 104(2), then the enterprise controller 200 would use context identifier [C_2, 1], and so on. Similarly, for UE 102(2) on RAP 104(1), the first context identifier would be [C_1,2], for UE 102(3) on RAP 104(1), the first context identifier would be [C_1,3], and so on. When UE 102(1) is camped on RAP 102(N), e.g., after a handover to RAP 102(N), then the enterprise controller 200 uses context identifier [C_N,1] shown at 300(N) for messages exchanged between RAP 104(N) on behalf of UE 102(1).

Similarly, the enterprise controller 200 uses a second context identifier, from a plurality of second context identifiers, for messages it sends to and receives from the HNB gateway 110 on behalf of a UE 102(1). These second identifiers are denoted as context identifiers [D_m,n], depending on which RAP a UE is camped on, where [D_m,n] means the context identifier for UE 102(n) when UE 102(n) is camped on RAP 104(m), for m=1 to N and n=1 to K. The enterprise controller 200 assigns different context identifiers according to this definition for the different UEs depending on which RAP the UE is camped on. For example, when UE 102(1) is camped on RAP 104(1), the enterprise controller 200 uses second context identifier [D_1,1] shown at 310(1) for messages exchanged with the HNB gateway 110 on behalf of UE 102 (1). If UE 102(1) were camped on RAP 104(2), then the enterprise controller 200 would use context identifier [D_2, 1], and so on. Similarly, for UE 102(2) on RAP 104(1), the second context identifier would be [D_1,2], for UE 102(3) on RAP 104(1), the second context identifier would be [D_1,3], and so on. If UE 102(1) is camped on RAP 102(N) (prior to a handover), then enterprise controller 200 would use second context identifier [D_N,1] shown at 310(N) for UE 102(1).

The enterprise controller 200 maps the first context identifier to a second context identifier for messages it exchanges on behalf of a UE. In the example of FIG. 3, the enterprise controller 200 maps [C_1,1] to [D_1,1] for UE 102(1). The types of messages for which the enterprise controller 200 uses the context identifiers are traffic messages, also known as "bearer" messages, which are messages containing voice or data associated with a communication session involving a UE. Other types of messages that the enterprise controller 200 may send to and receive from RAPs, and likewise send to and receive from the HNB gateway, are control messages and they do not pertain to a particular UE. The enterprise controller 200 does not use the context identifiers for the control messages.

When a UE roams from one RAP to another RAP, the enterprise controller 200 is configured to generate a new first context identifier based on the RAP to which the UE has roamed, and maps that new first context identifier to the existing second context identifier that the enterprise had been previously using for that UE prior to the handover. FIG. 3 shows an example where UE 102(1) is camped on RAP 104(1) and then roams to and hands over to RAP 104(N). Thus, the enterprise controller 200 would generate a new first context identifier [C_N,1] for UE 102(1). The second context identifier that the enterprise had generated and used for UE 102(1) prior to the handover was [D_1,1], which had been mapped to [C_1,1]. Thus, upon handover, the enterprise controller 200 would re-map [D_1,1] to [C_N,1]. The HNB gateway 110 would continue to use the second context identifier [D_1,1] for messages it sends on behalf of UE 102(1) and would not be aware of the handover that occurred for UE 102(1). The enterprise controller 200, however, would know that messages with second context identifier [D_1,1] are now mapped to first context identifier [C_N,1] when the enterprise controller 200 sends those messages on to the RAPs, and in particular, to RAP 104(N). The updated correspondence or mapping of first context identifiers to second context identifiers is maintained in the context identifier mapping data 405 in memory 230 of the enterprise controller 200 as shown in FIG. 2. This same process is performed each time any of the UEs roams (hands over) from one RAP device to another RAP device. The HNB gateway 110 needs only to store a single second context identifier for any UE and continues to use that same context identifier in communication sessions for UEs even as they roam about an enterprise between RAPs controlled by the enterprise controller 200. Likewise, the enterprise controller 200 continues to use that same context identifier, despite roaming of the UE, when it sends outbound messages to the HNB gateway 110.

Figure 4:
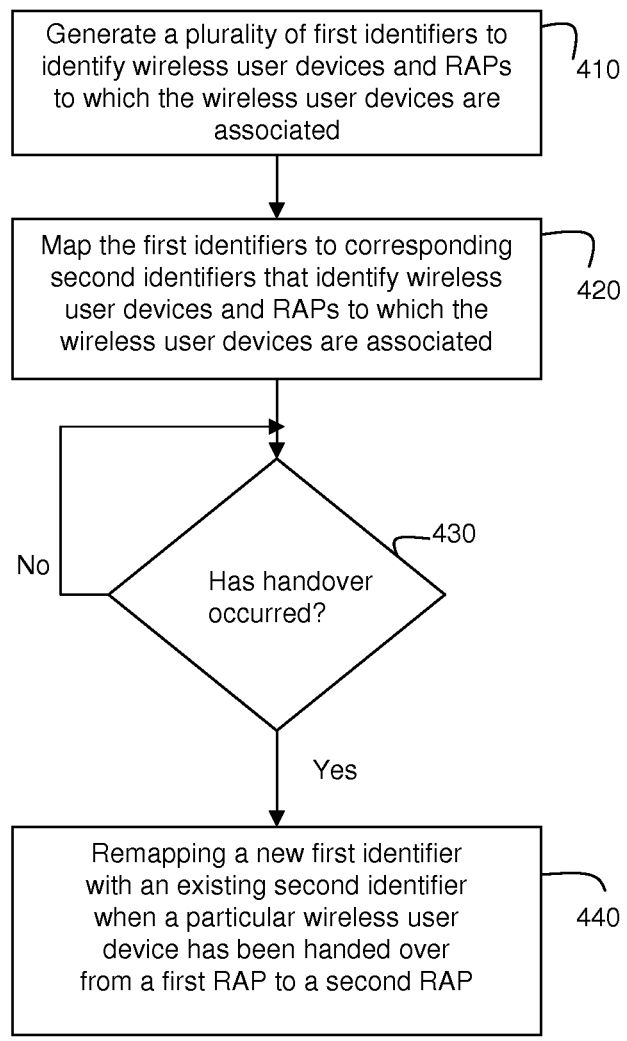
FIG. 4 is an example of a flow chart depicting operations of the handover triggered context identifier generating and mapping logic executed in a RAP device.

Reference is now made to FIG. 4 for a description of the process logic 400 in performing the context identifier generation, mapping and re-mapping operations as generally described above in connection with FIG. 3. At 410, the enterprise controller 100 generates a plurality of first identifiers, i.e., [C_ij]s, for inbound from RAPs and outbound communications to RAPs to identify UEs and RAPs to which the UEs are associated. The first identifiers may be any identifier configured to perform this identification function. For example, the identifiers may be context identifiers [C_ij]s for stream control transmission protocol (SCTP) connections or radio access network application protocol (RANAP) connections between the RAPs 104(1)-104(N) and the enterprise controller 200. Referring back to FIG. 3, context identifiers between RAP 104(1)-104(N) are shown at 300(1)-300(N).

At 420, the enterprise controller 200 maps the first identifiers associated with messages exchanged between the enterprise controller 200 and the RAPs 104(1)-104(N) to second identifiers associated with messages exchanged between the enterprise controller 200 and the HNB gateway 110. The effect of this mapping is to allow bearer messages sent by a UE via the RAP where the UE is camped and received by the enterprise controller 200 to be sent to the HNB gateway 110 with appropriate context identifiers identifying the UE and the RAP where it is associated. Similarly, this mapping allows bearer messages received at the enterprise controller 200 from the HNB gateway 110 to be sent by the enterprise controller to the appropriate RAP with appropriate context identifiers identifying the UE and the RAP where it is associated. This mapping operation occurs when a UE first associates to any of the RAPs 104(1)-104(N) under control of the enterprise controller 200, after which messages will be routed appropriately as explained above. However, when a UE roams (hands over) from the RAP where it is currently associated to a different RAP, the enterprise controller 200 performs some additional operations.

Thus, at step 430, the enterprise controller 200 determines whether a UE has been handed over from the RAP where it was previously camped, generally referred to as a first RAP, to another RAP, referred to as a second RAP. As described above, RAPs 104(1)-104(N) may handover communication with UEs as the UEs move from one location to another and can obtain better signal reception with a different RAP. For example, referring back to FIG. 3, UE 102(1) may be handed over to RAP 104(N) (as indicated by the arrows in FIG. 3) if, e.g., UE 102(1) moves to a location close in proximity to RAP 104(N) or otherwise receives better signal reception from RAP 104(N). The handover of UE 102(1) to RAP 104(N) would result in UE 102(1) camping on RAP 104(N) instead of RAP 104(1).

When it is determined that a UE has not roamed to another RAP, then the process shown in FIG. 4 reverts to a wait mode waiting for a handover event. When a handover event occurs for a particular UE from a first RAP to a second RAP, then at 440, the enterprise controller 200 remaps a new first context identifier to indicate the UE's location at the second RAP with an existing second identifier. For example, referring back to FIG. 3, if UE 102(1) is handed over to RAP 104(N), the enterprise controller assigns new first context identifier 300(N) for messages exchanged between the enterprise controller 200 and the new RAP 104(N) on behalf of UE 102(1). The first new identifier identifies UE 102(1) and the new RAP 104(N) where the UE 102(1) is now associated. The enterprise controller 200 maps new first context identifier 300(N) to the same second context identifier used for UE(1) before handover, that is, to second context identifier [D,_1,1] shown at 310(1). Consequently, a message with a context identifier 300(N) is mapped to context identifier 310(1) and is sent on a connection (e.g., SCTP connection) associated with context identifier 310(1). Similarly, after handover, a message with a context identifier 310(1) is mapped to context identifier 300(N) and is sent on a connection (e.g., SCTP connection) to RAP 104(N). Additionally, the enterprise controller 200 stores an indication in data 405 in memory 230 of the remapping of the new first context identifier to the existing second context identifier.

The remapping of the new first identifier to an existing second identifier after a UE has been handed over provides for on-premise mobility management of UEs without notifying the HNB gateway 110 about the new RAP location of UEs. In other words, as a result of the remapping process, the HNB gateway 110 is not made aware of any handovers of UEs at the RAPs 104(1)-104(N).

When the enterprise controller 200 receives a message from a RAP to be sent to the HNB gateway 110, it refers to the mapping data 405 and associates the first context identifier contained in the received message to retrieve and use a corresponding second context identifier when it sends the message to the HNB gateway 110 so that the HNB gateway receives the message with the proper second context identifier. Similarly, the enterprise controller 200 refers to the mapping data 405 when it receives an inbound message from the HNB gateway 110 and associates the second context identifier contained in the message to a corresponding first context identifier to send the message to the appropriate RAP where the UE is currently located. The first context identifier may change as the UE roams from one RAP to another RAP, but the second context identifier, which the HNB gateway 110 will learn the first time a UE camps onto a RAP under control of the enterprise controller 200, will always be the same. Only the enterprise controller 200 needs to update the association or assignment of the second context identifier, which does not change, to the first context identifier, which can change. Since the HNB gateway 110 sees the same context identifier for a given UE, it is never notified about the roaming of a UE among the plurality of RAPs under control of the enterprise controller 200. In other words, for outbound messages received from a particular UE via a radio access point device to be forwarded to the HNB gateway 110, the enterprise controller 200 refers to the stored data 405 to retrieve a corresponding second identifier based on a first identifier contained in the outbound message, and sends (forwards) the outbound message with the corresponding second identifier (replacing the first identifier with the corresponding second identifier in the outbound message) to the HNB gateway 110. And conversely, for inbound messages received from the HNB gateway 110 to be forwarded to a particular UE via a radio access point device, the enterprise controller refers to the stored data 405 to retrieve a corresponding first identifier based on a second identifier contained in the inbound message, and sends (forwards) the inbound message with the corresponding first identifier (replacing the second identifier with the corresponding first identifier in the inbound message) to the radio access point device where the particular UE is associated.

Figure 5:
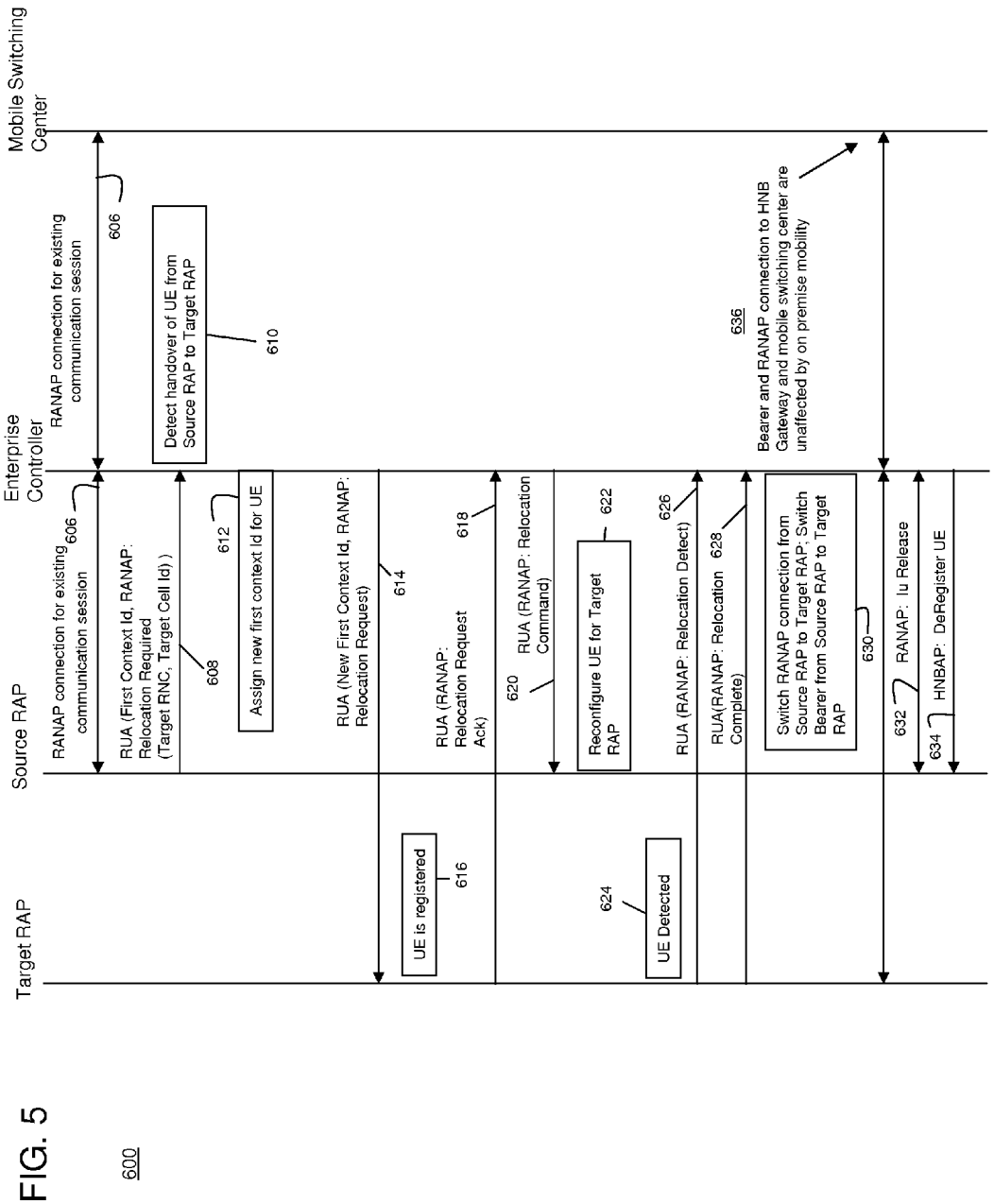
FIG. 5 is an example of a ladder diagram depicting the message flow between RAP devices and the enterprise controller during a handover according to the techniques described herein.

Reference is now made to FIG. 5. FIG. 5 shows an example of a ladder diagram for control message flow associated with on-premise handover of a UE from a source RAP to a target RAP. The source RAP is the RAP where the UE is currently camped. At 606, a radio access network application protocol (RANAP) connection for an existing communication session is shown. The RANAP connection may be established for a voice call or data session on behalf of a UE for communication between a source RAP with which the UE is associated and the enterprise controller 200, and between mobile switching center 114 and the enterprise controller 200. At 608, the source RAP where the UE is camped sends a RANAP user adaptation (RUA) message to the enterprise controller 200, which contains, among other things, a first context identifier (as described above) and a target RNC 116, for which the message is destined and target cell identifier. The target cell identifier identifies the RAP (or possibly a macrocell tower) for which handover is to be made. At 610, the enterprise controller 200 determines whether the UE has been handed over to another RAP, e.g., the target RAP. If handover is detected, the enterprise controller, at 612, assigns a new context identifier for the message in accordance with the techniques described above, and at 614, sends a RUA message containing a relocation request to the target RAP to request that the UE be associated at the target RAP. The UE is registered at the target RAP at 616.

At 618, the target RAP sends a Relocation Request Acknowledgement (Ack) message to the enterprise controller 200. In response to receiving the Ack message, at 620 the enterprise controller 200 sends a RUA Relocation Command message to the source RAP. At 622, the source RAP sends a message to the UE to reconfigure it to handover to the target RAP. A 624, the target RAP detects the UE. At 626, the target RAP sends a RUA Relocation Detect message to the enterprise controller 200 indicating that it has detected relocation of the UE. At 628, the target RAP sends a RUA Relocation Complete message indicating that the UE handover to the target RAP is complete. In response to receiving the Relocation Complete message, the enterprise controller 200 at 630 switches the RANAP connection from the source RAP to the target RAP and switches bearer traffic from the source RAP to the target RAP. It is at this time that the enterprise controller 200 performs the re-mapping operation referred to above in connection with operation 440 in FIG. 4. At 632, the source RAP and the enterprise controller 200 perform a Lu target release exchange, and then at 634, the enterprise controller 200 sends a DeRegister UE message to the source RAP indicating that it should de-register that particular UE since it has now handed over to the target RAP.

It should be appreciated that, as indicated at 636, the RANAP connection between the enterprise controller 200 and the mobile switching center 114 is unaffected by the handover of the UE from the source RAP to the target RAP. Accordingly, any associated connections between the enterprise controller 200 and the mobile switching center 114, such as bearer signal sessions, are unaffected by the on-premise mobility of the UE.

Control message routing (which does not use the first and second context identifiers referred to herein) may be sent as follows:

HNB Access Protocol (HNBAP) messages are sent over SCTP over Internet Protocol Security (IPSec), and RUA messages over SCTP over IPSec between RAPs and the HNB gateway 110.

Bearer messages are sent using Real-Time Transport Protocol (RTP)/User Datagram Protocol (UDP)/IP over IPSec or IP/GPRS Tunneling Protocol (GTP)/UDP over IPSec, between RAPs and the HNB gateway 110.

In sum, a method is provided comprising: at a controller apparatus configured to control a plurality of radio access point devices operating within their respective coverage areas of a wireless cellular communication network to serve wireless user devices, generating a plurality of first identifiers used for communications on behalf of corresponding wireless user devices between the controller apparatus and respective radio access point devices, wherein each first identifier identifies a wireless user device and a radio access point device to which the wireless user device is associated; mapping each first identifier to a corresponding one of a plurality of second identifiers for communications exchanged on behalf of the wireless user devices between the controller apparatus and a gateway apparatus in the wireless cellular communication network, wherein each second identifier identifies a wireless user device and a radio access point device to which the wireless user device is associated; and re-mapping a new first identifier to an existing second identifier when a particular wireless user device has handed over from a first radio access point device to a second radio access point device.

In addition, an apparatus is provided comprising a network interface device, a memory and a processor. The network interface device is configured to send and receive messages over a network to communicate with a plurality of radio access point devices operating within their respective coverage areas of a wireless cellular communication network to serve wireless user devices. The processor is configured to generate a plurality of first identifiers used for the communications with respective radio access point devices, wherein each first identifier identifies a wireless user device and a radio access point device to which the wireless user device is associated. The processor stores in the memory data that maps each first identifier to a corresponding one of a plurality of second identifiers for communications exchanged on behalf of the wireless user devices with a gateway apparatus in a wireless cellular communication network, wherein each second identifier identifies a wireless user device and a radio access point device to which the wireless user device is associated. Further, the processor is configured to update the stored data to re-map a new first identifier to an existing second identifier when a particular wireless user device has handed over from a first radio access point device to a second radio access point device.

Similarly, one or more computer readable storage media is provided that is encoded with software comprising computer executable instructions. When the software is executed, it is operable to, at a controller apparatus configured to control a plurality of radio access point devices operating in a wireless cellular communication network, generate a plurality of first identifiers used for communications on behalf of corresponding wireless user devices between a controller apparatus and respective radio access point devices, wherein each first identifier identifies a wireless user device and a radio access point device to which the wireless user device is associated; map each first identifier to a corresponding one of a plurality of second identifiers for communications exchanged on behalf of the wireless user devices between the controller apparatus and a gateway apparatus in the wireless cellular communication network, wherein each second identifier identifies a wireless user device and a radio access point device to which the wireless user device is associated. Furthermore, the computer readable storage media is operable to re-map a new first identifier to an existing second identifier when a particular wireless user device has handed over from a first radio access point device to a second radio access point device.

The above description is intended by way of example only. Various modifications and structural changes may be made therein without departing from the scope of the concepts described herein and within the scope and range of equivalents of the claims.

What is claimed is:

1. A method comprising:
 at a controller apparatus configured to control a plurality of radio access point devices operating within their respective coverage areas of a wireless cellular communication network to serve wireless user devices, generating a plurality of first identifiers used for communications on behalf of corresponding wireless user devices between the controller apparatus and respective radio access point devices, wherein each first identifier identifies a wireless user device and a radio access point device to which the wireless user device is associated;
 mapping each first identifier to a corresponding one of a plurality of second identifiers for communications exchanged on behalf of the wireless user devices between the controller apparatus and a gateway apparatus in the wireless cellular communication network, wherein each second identifier identifies a wireless user device and a radio access point device to which the wireless user device is associated;
 re-mapping a new first identifier to an existing second identifier when a particular wireless user device has handed over from a first radio access point device to a second radio access point device without notifying the gateway apparatus that the particular wireless user device has handed over from the first radio access point device to the second radio access point device such that the gateway apparatus is not aware of the new first identifier associated with the user device, and such that the re-mapping causes the gateway apparatus to use the existing second identifier for communications exchanged on behalf of the particular wireless user device;

when it is determined that the particular wireless user device has handed over from the first radio access point device to the second radio access point device, assigning the new first identifier for messages exchanged between the controller apparatus and the second radio access point device on behalf of the particular wireless user device, wherein the new first identifier indicates that the particular wireless user device is associated at the second radio access point device;

storing in a memory at the controller apparatus, data for the plurality of first identifiers and the plurality of second identifiers and representing the mapping between respective ones of the first identifiers with respective ones of the second identifiers; and updating the memory when the particular wireless user device has handed over from the first radio access point device to the second radio access point device.

2. The method of claim 1, wherein for outbound messages received from the particular wireless user device via a radio access point device to be forwarded to the gateway apparatus, the controller apparatus further comprising referring to the stored data to retrieve a corresponding second identifier based on a first identifier contained in the message, and sending the message with the corresponding second identifier to the gateway apparatus.

3. The method of claim 1, wherein for inbound messages received from the gateway apparatus to be forwarded to the particular wireless user device via a radio access point device, the controller apparatus further comprising referring to the stored data to retrieve a corresponding first identifier based on a second identifier contained in the inbound message, and sending the inbound message with the corresponding first identifier to the radio access point device where the particular wireless user device is associated.

4. The method of claim 1, wherein generating, mapping and re-mapping are performed for messages carrying traffic for wireless user devices.

5. The method of claim 1, wherein re-mapping further comprises:

varying a set of first identifiers that are mapped during communication sessions to include new first identifiers that indicate current associations between the wireless user devices and the radio access point devices; and keeping the second identifiers static throughout communication sessions such that, for each second identifier, the radio access point device identified by the second identifier remains the radio access point device to which the wireless user device identified by the second identifier was initially associated at the time the second identifier was initially mapped to a first identifier.

6. The method of claim 1, wherein:

the radio access point devices are femtocell or picocell access point devices located on a common premises of an enterprise;

the gateway apparatus is a Home Node B (HNB) gateway apparatus;

the network interface device is coupled to the femtocell or picocell access point devices via a local area network and coupled to the HNB gateway apparatus via a wide area network; and the controller apparatus comprises an enterprise controller configured to perform the mapping and re-mapping to provide on-premise mobility management of the wireless user devices such that the HNB gateway device has no visibility or awareness of any handovers of the wireless user devices between the femtocell or picocell radio access point devices.

7. One or more non-transitory computer readable storage media encoded with software comprising computer executable instructions and when the software is executed operable to:

at a controller apparatus configured to control a plurality of radio access point devices operating in a wireless cellular communication network, generate a plurality of first identifiers used for communications on behalf of corresponding wireless user devices between the controller apparatus and the radio access point devices, wherein each first identifier identifies a wireless user device and a radio access point device to which the wireless user device is associated;

map each first identifier to a corresponding one of a plurality of second identifiers for communications exchanged on behalf of the wireless user devices between the controller apparatus and a gateway apparatus in the wireless cellular communication network, wherein each second identifier identifies a wireless user device and a radio access point device to which the wireless user device is associated;

re-map a new first identifier to an existing second identifier when a particular wireless user device has handed over from a first radio access point device to a second radio access point device without notifying the gateway apparatus that the particular wireless user device has handed over from the first radio access point device to the second radio access point device such that the gateway apparatus is not aware of the new first identifier associated with the user device to cause the gateway apparatus to use the existing second identifier for communications exchanged on behalf of the particular wireless user device, and such that the gateway apparatus uses the existing second identifier for communications exchanged on behalf of the particular wireless user device;

when it is determined that the particular wireless user device has handed over from the first radio access point device to the second radio access point device, assign the new first identifier for messages exchanged between the controller apparatus and the second radio access point device on behalf of the particular wireless user device, wherein the new first identifier indicates that the particular wireless user device is associated at the second radio access point device;

store in a memory at the controller apparatus, data for the plurality of first identifiers and the plurality of second identifiers and representing the mapping between respective ones of the first identifiers with respective ones of the second identifiers; and update the memory when the particular wireless user device has handed over from the first radio access point device to the second radio access point device.

8. The non-transitory computer readable storage media of claim 7, and further comprising instructions that operable to, for outbound messages received from the particular wireless user device via a radio access point device to be forwarded to the gateway apparatus, refer to the stored data to retrieve a corresponding second identifier based on a first identifier contained in the message, and send the message with the corresponding second identifier to the gateway apparatus.

9. The non-transitory computer readable storage media of claim 7, and further comprising instructions that are operable to, for inbound messages received from the gateway apparatus to be forwarded to the particular wireless user device via a radio access point device, refer to the stored data to retrieve a corresponding first identifier based on a second identifier contained in the inbound message, and send the inbound message with the corresponding first identifier to the radio access point device where the particular wireless user device is associated.

10. The non-transitory computer readable storage media of claim 7, wherein the instructions that are operable to generate, map and remap comprise instructions operable to generate the first identifiers, map each first identifier, and remap the new first identifier for messages carrying traffic for wireless user devices.

11. The non-transitory computer readable storage media of claim 7, wherein the instructions that are operable to re-map comprise instructions that are operable to:
vary a set of first identifiers that are mapped during communication sessions to include new first identifiers that indicate current associations between the wireless user devices and the radio access point devices; and
keep the second identifiers static throughout communication sessions such that, for each second identifier, the radio access point device identified by the second identifier remains the radio access point device to which the wireless user device identified by the second identifier was initially associated at the time the second identifier was initially mapped to a first identifier.

12. The non-transitory computer readable storage media of claim 7, wherein:
the radio access point devices are femtocell or picocell access point devices located on a common premises of an enterprise;
the gateway apparatus is a Home Node B (HNB) gateway apparatus;
the network interface device is coupled to the femtocell or picocell access point devices via a local area network and coupled to the HNB gateway apparatus via a wide area network; and
the controller apparatus comprises an enterprise controller such that the instructions operable to map and re-map provide on-premise mobility management of the wireless user devices such that the HNB gateway device has no visibility or awareness of any handovers of the wireless user devices between the femtocell or picocell radio access point devices.

13. An apparatus, comprising:
a network interface device configured to send and receive messages over a network to communicate with a plurality of radio access point devices operating within their respective coverage areas of a wireless cellular communication network to serve wireless user devices;
a memory configured to store data; and
a processor coupled to the network interface and configured to:
generate a plurality of first identifiers used for the communications with respective radio access point devices over the network, wherein each first identifier identifies a wireless user device and a radio access point device to which the wireless user device is associated;
store in the memory data that maps each first identifier to a corresponding one of a plurality of second identifiers for communications exchanged on behalf of the wireless user devices with a gateway apparatus in the wireless cellular communication network, wherein each second identifier identifies a wireless user device and a radio access point device to which the wireless user device is associated;
update the stored data to re-map a new first identifier to an existing second identifier when a particular wireless user device has handed over from a first radio access point device to a second radio access point device without notifying the gateway apparatus that the particular wireless user device has handed over from the first radio access point device to the second radio access point device such that the gateway apparatus is not aware of the new first identifier associated with the user device to cause the gateway apparatus to use the existing second identifier for communications exchanged on behalf of the particular wireless user device;
when it is determined that the particular wireless user device has handed over from the first radio access point device to the second radio access point device, assign the new first identifier for messages exchanged between the controller apparatus and the second radio access point device on behalf of the particular wireless user device, wherein the new first identifier indicates that the particular wireless user device is associated at the second radio access point device;
store data for the plurality of first identifiers and the plurality of second identifiers and representing the mapping between respective ones of the first identifiers with respective ones of the second identifiers; and
update the data when the particular wireless user device has handed over from the first radio access point device to the second radio access point device.

14. The apparatus of claim 13, wherein the processor is further configured to, for outbound messages received from the particular wireless user device via a radio access point device to be forwarded to the gateway apparatus, refer to the stored data in the memory to retrieve a corresponding second identifier based on a first identifier contained in the message, and forward, via the network interface device, the message with the corresponding second identifier to the gateway apparatus.

15. The apparatus of claim 13, wherein the processor is further configured to, for inbound messages received from the gateway apparatus to be forwarded to the particular wireless user device via a radio access point device, refer to the stored data in the memory to retrieve a corresponding first identifier based on a second identifier contained in the inbound message, and forward, via the network interface device, the inbound message with the corresponding first identifier to the radio access point device where the particular wireless user device is associated.

16. The apparatus of claim 13, wherein:
a set of first identifiers that are mapped varies during communication sessions to include new first identifiers that indicate current associations between the wireless user devices and the radio access point devices; and
the second identifiers are static throughout communication sessions such that, for each second identifier, the radio access point device identified by the second identifier remains the radio access point device to which the wireless user device identified by the second identifier was initially associated at the time the second identifier was initially mapped to a first identifier.

17. The apparatus of claim 13, wherein:
the radio access point devices are femtocell or picocell access point devices located on a common premises of an enterprise;
the gateway apparatus is a Home Node B (HNB) gateway apparatus;
the network interface device is coupled to the femtocell or picocell access point devices via a local area network and coupled to the HNB gateway apparatus via a wide area network; and
the apparatus comprises an enterprise controller configured to provide on-premise mobility management of the wireless user devices such that the HNB gateway device has no visibility or awareness of any handovers of the wireless user devices between the femtocell or picocell radio access point devices.

\* \* \* \* \*